June 9, 1964 E. D. DOWLING 3,136,330
SHUT OFF VALVES FOR HIGH TEMPERATURE SERVICE
Filed May 16, 1960 5 Sheets-Sheet 1

INVENTOR.
EDWARD D. DOWLING
BY S. H. Palmer
V. F. Davies
ATTORNEYS

FIG. 5

INVENTOR.
EDWARD D. DOWLING
BY S. H. Palmer
V. F. Davies
ATTORNEYS

June 9, 1964  E. D. DOWLING  3,136,330
SHUT OFF VALVES FOR HIGH TEMPERATURE SERVICE
Filed May 16, 1960  5 Sheets-Sheet 4

INVENTOR.
EDWARD D. DOWLING
BY S. H. Palmer
V. F. Davico
ATTORNEYS

INVENTOR.
EDWARD D. DOWLING

# United States Patent Office 3,136,330
Patented June 9, 1964

3,136,330
SHUT OFF VALVES FOR HIGH
TEMPERATURE SERVICE
Edward D. Dowling, Queens Village, N.Y., assignor, by mesne assignments, to Pullman Incorporated, a corporation of Delaware
Filed May 16, 1960, Ser. No. 29,328
10 Claims. (Cl. 137—340)

This invention relates to shut off valves, and more particularly, to shut off valves for controlling the flow of fluid media at highly elevated temperatures.

It is the principal object of this invention to provide a shut off valve for controlling the flow of fluid medium in a conduit, which medium in an operating cycle may range in temperature from a moderate temperature to a highly elevated temperature, and in pressure from atmospheric to an elevated pressure, said valve so constructed and arranged that when actuated to the flow shut off position it will shut off flow in said conduit in either direction past said valve regardless of the temperature and pressure at either side thereof.

It is also a principal object of the invention to provide a shut off valve for controlling the flow of fluid medium at extremely high temperatures, which is comparable in reliability to similar valves in low temperature service, is free from sticking in the shut, or in the open, position and can be operated from one to the other of said positions under reasonable stem loads.

It is a further principal object of the invention to provide a shut off valve for controlling the flow of fluid medium at temperatures above those that can be reliably handled by uncooled valves formed of special high temperature resisting alloys, that is made from common materials of construction such as carbon steel and low alloy steels, and by its construction, as well as its cooling and insulation, is comparable in reliability to similar valves designed for low temperature service, is free from sticking and can be operated under reasonable stem loads.

It is also an important object of the invention to provide a shut off valve for controlling the flow of fluid medium at extremely high temperatures, which includes a replaceable sealing disc assembly that is standard for all valves of the same size whereby field repairs of the valves may be effected by replacement of said discs.

It is also an important object of this invention to provide a shut off valve for controlling the flow of fluid medium at extremely high temperatures through a conduit, which is provided with an elastically flexible closure member movable between valve open and valve closed positions, and including a seating element adapted in the said closed position to engage a corresponding seat defining element fixed to the valve body, said seating element mounted for limited universal movement to permit accurate alignment thereof with said corresponding seat defining element.

It is a still further important object of this invention to provide a shut off valve for controlling the flow of fluid medium, at extremely high temperatures, through a conduit which is provided with an elastically flexible closure member movable between valve open and valve closed positions, and including seating elements at each side thereof adapted in said closed position to engage corresponding seat defining elements fixed to the valve body and located upstream and downstream of said closure member, said seating elements adapted when engaged in said closed position to effectively cut off flow in either direction on the sides of said valve, thereby effecting double valving, and preventing intermixing between upstream and downstream content of said conduit, said valve including means for bleeding from said valve, fluid entering the space thereof between said seats.

The further objects, features and advantages of the invention will become apparent from a consideration of the following detailed description of a present preferred embodiment thereof taken with the accompanying drawings, in which.

The valve of the invention is of general application and may be used in any service that involves handling a highly heated fluid medium. Thus, the valve may be used to control the flow of highly heated gaseous fluids through conduits in petroleum refineries, petro-chemical plants, chemical plants, ore reducing plants, and similar. The fluid medium controlled may be at a highly elevated temperature throughout the operating cycle, or may vary gradually, or stepwise, in temperature from said highly elevated temperatures to ambient temperature. Both sides of the valve when closed may be at the same temperature and pressure, or the temperature and pressure may be radically different on the sides of the valve.

For the purposes of this application, a present preferred embodiment of the invention will be specifically disclosed in connection with an oxide ore reduction plant wherein the valve of the invention is employed for controlling the flow of the reducing gas at temperatures which reach, and exceed, 1600° F., in a conduit which is employed as the reducing gas transfer line. The reducing gas is made up predominantly of hydrogen and carbon monoxide and enters into the transfer line at about 1600° F., or higher, and passes in a regular cycle to several reactors which contain the ore to be reduced. In this service each valve employed for connecting the transfer line to one of the reactors is, or may be, subjected to the following varying conditions:

(a) Closing at 200° F. then subjected to a flow at 1600° F. or higher, past one side while the opposite side remains at about 200° F. After several hours the hot side cools rapidly to about 200° F.

(b) Opening at low differential pressure with both sides at 200° F.; flow temperature builds up rapidly to 1600° F. remaining at that level for several hours then dropping quickly to 200° F.

(c) Remaining closed for an indefinite period which may be as long as several months and in said closed condition sealing against varying differential pressures up to 50 p.s.i.g. with either side cycling between 200° and 1600° F.

(d) Opening under the conditions stated in (c) above.

(e) Closing when the flowing temperature is 1600° F. and against the full 50 p.s.i.g. pressure.

It is expected that from time to time the valves may be subjected to temperatures much higher than 1600° F.

The transfer lines conducting the hot reducing gases are fabricated from steel plate, that is, either carbon steel or low ferritic alloy such as carbon—one-half percent molybdenum steel. These conduits are provided with an internal insulating lining to maintain the temperature of the conduit walls in the range wherein the strength and other properties of the metal thereof are not overly affected by the temperature and are satisfactory and sufficient for the service. The valve bodies of the valve of the invention will be similarly constructed with an internal lining designed to reduce the outside temperature to well within the range at which the metal of the bodies exhibits satisfactory strength and other properties, specifically a temperature of 650° F. will be considered maximum.

Figures 1, 10, 11:
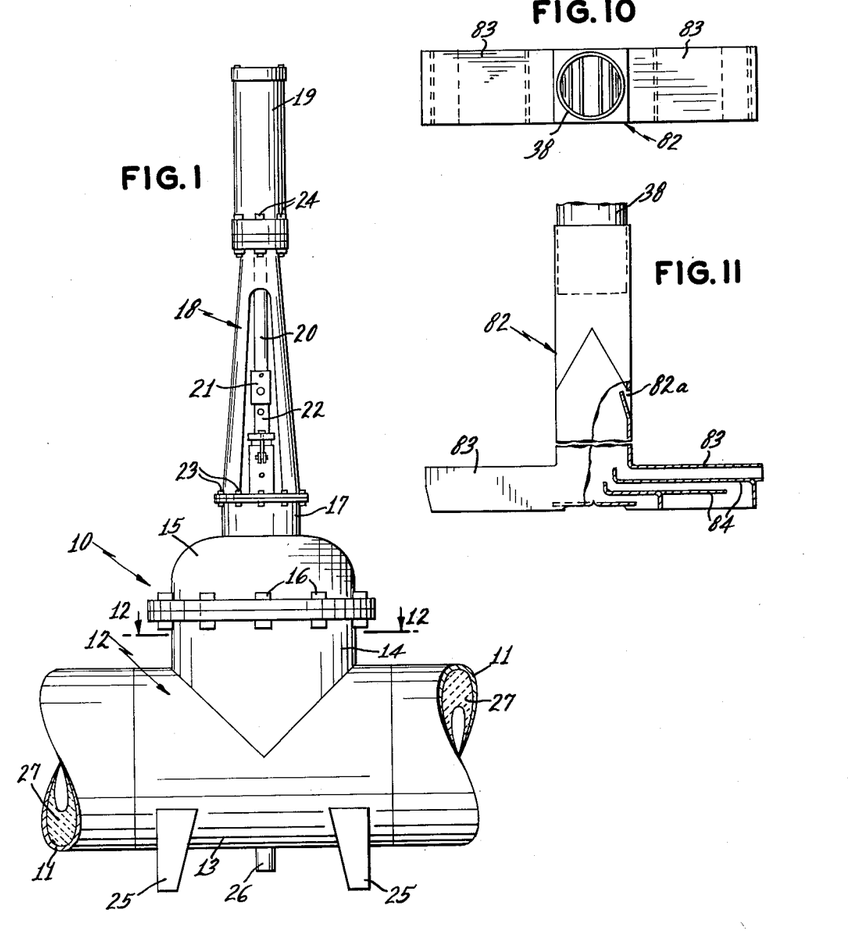
FIG. 1 is a front elevation of a valve embodying a present preferred form of the invention.
FIG. 10 is a plan view of a cooling water distributing tube.
FIG. 11 is a front elevation of the tube of FIG. 10, with parts broken away to show the details of the internal construction.

Referring now to the drawings wherein a present preferred embodiment of the invention is illustrated, as shown in FIG. 1, the valve 10 is positioned between conduit ends 11 and is united thereto in a convenient manner as by welding. The highly heated fluid medium enters the upstream end of the valve 10, and when the valve is in the open position, exits out of the downstream end of the valve 10. Since the valve 10 is symmetric about a plane passing through its center and normal to the path of the fluid therethrough, either end of the valve 10 may be the inlet end thereof. The valve 10 includes a valve body 12 formed of intersecting cylindrical members 13 and 14 to form a T like body. Member 14 is provided with a body bonnet flange at its upper end, upon which is positioned the bonnet flange of the valve bonnet 15. The bonnet flange is connected to the body bonnet flange by suitable connecting members, as bolts 16. The joint between these flanges may be sealed by welding a bead between the flanges as explained hereinafter. From the valve bonnet 15 extends a short cylindrical bonnet trunnion member 17 which carries at its end the bonnet yoke flange. Upon this bonnet yoke flange rests the bottom flange of the valve yoke 18. The valve yoke 18 also has a flange at its upper end upon which is mounted the rod end of the cylinder head of the hydraulic cylinder 19. From the hydraulic cylinder extends the piston rod 20 which is connected to the clevis 21 attached to the valve stem 22. The yoke flanges are respectively connected to the bonnet flange and cylinder head as by bolts 23 and 24 in the usual manner. A set of four floor stand members 25 are attached to the valve body 12 adjacent the ends thereof so as to provide for supporting the valve on the floor or on a suitable platform to facilitate manufacture and assembly. A valved drain line 26 which opens into the inside of the valve is provided for removing seepage material from the valve interior. The conduit ends 11 are internally lined with insulation material 27 of a character, and of thickness, such as to maintain the walls of said conduit below a predetermined maximum temperature during operation.

By way of example, rather than by way of limitation, the valve shown in FIG. 1 is a 24" valve, i.e., a valve with an effective flow section of 24" diameter. The conduits 11 are of about 41¼" external diameter with the lining 27 of a thickness to provide a flow path within the conduit of about 24" diameter. With insulation of proper character and the thickness indicated, a temperature of 650° F. is maintained as a maximum in the walls of the conduits 11 when the fluid medium flowing through the conduits 11 is at a temperature of about 1600° F. or higher. The conduits 11 are formed of carbon steel or of a low alloy steel, as for instance, a carbon steel containing about ½% molybdenum.

Figures 2, 3, 4:
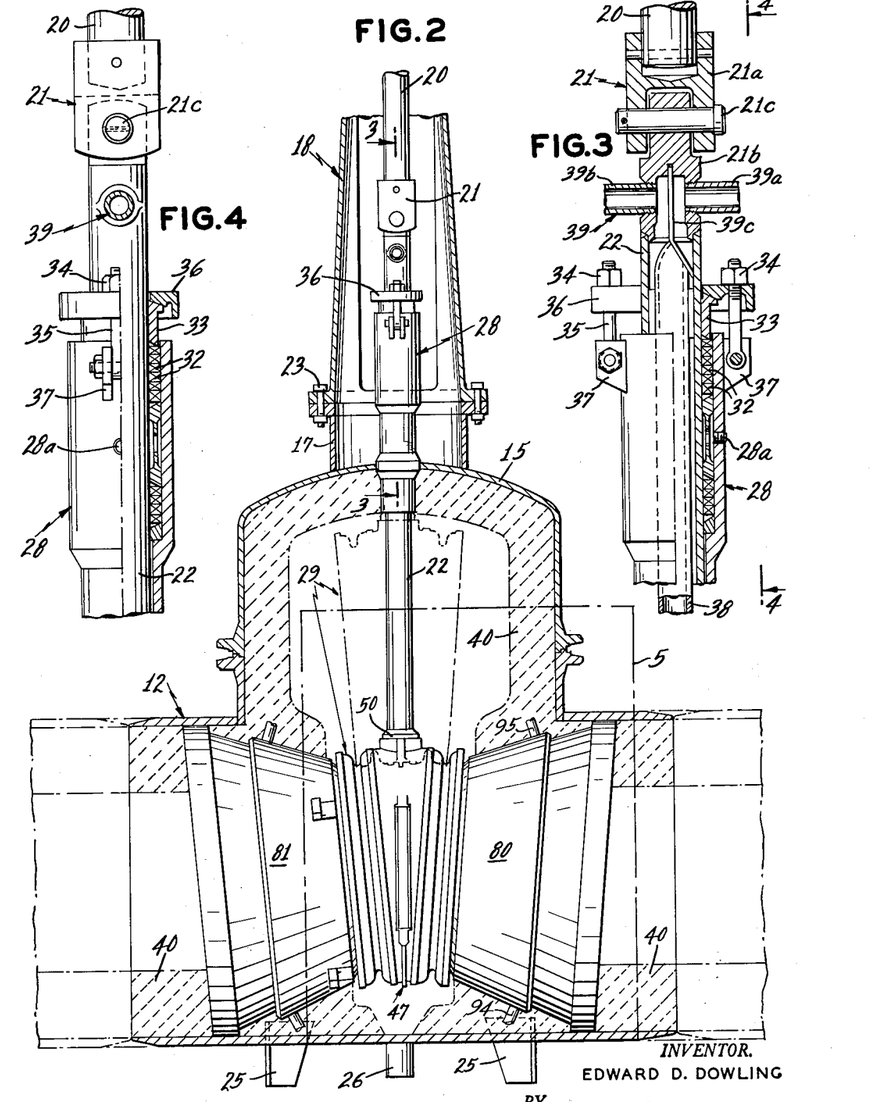
FIG. 2 is an enlarged sectional view of the valve of FIG. 1, taken in the plane of the paper of FIG. 1, with certain of the valve parts omitted.
FIG. 3 is a sectional view taken on line 3—3 of FIG. 2, but on an enlarged scale.
FIG. 4 is a fragmentary, part sectional view of the valve of FIG. 2, on an enlarged scale, taken in the direction 4—4 of FIG. 3.

Referring now to FIG. 2 et seq., wherein the details of the valve 10 are illustrated. The piston rod 20 has its lower end attached as by screwing or pinning to the upper end of the female member 21a. The male member 21b of the clevis 21 is attached as by welding to the upper end of the hollow valve stem 22. A clevis pin 21c unites the female and the male members 21a and 21b so that the hollow stem tube 22 may have a limited swinging motion relative to the piston rod 20. The hollow valve stem or stem tube 22, extends downwardly through a stuffing box 28 attached to the bonnet head and into the internal space of the valve. The valve disc structure 29 is carried at the lower end of the stem tube. The stuffing box 28 extends into the upper end of the valve bonnet 15, to the surface of the insulation lining 40 thereof. An enlarged section of the stuffing box 28 engages the periphery of a hole in the top of the bonnet or bonnet head, and a weld unites said enlarged portion to said bonnet head while sealing the joint therebetween. The lower end of the stuffing box 28 within the bonnet may have a conical seat formation 30, FIG. 13, formed thereon to engage the conical seat member 31 formed at the lower enlarged end of the stem tube 22, so that when the stem tube is brought to its uppermost position the seating of the elements 30 and 31 will seal the space between the stuffing box 28 and the stem tube 22.

The upper end of the stuffing box 28 is enlarged to provide a sufficient space between its inner wall and the stem tube 22 to accommodate the packing 32. Packing 32 may include a central lantern ring or stuffing box spacer, and a bottom bushing, all of conventional design. Pressure is exerted on the packing through the packing gland 33 which bears on the packing 32. The packing gland 33 is moved downwardly by rotating the nuts 32 carried at the ends of the gland flange bolts 35 which extend through the gland flange 36 and are pivoted between lugs or ears 37 which extend from the stuffing box 28.

The stem tube 22 is hollow and houses therein a hollow tube 38 which conducts cooling water to the bottom disc assembly 29. Between the tube 38 and the stem tube 22 is an annular space through which the water exits from the disc assembly 29. At the upper end of the stem tube is a connection 39 which includes a cooling water inlet connection 39a, a cooling water outlet connection 39b, and a flow separating baffle 39c. This baffle 39c separates the space within the connection 39 so that the incoming water and the outgoing water do not intermingle. The stuffing box 28 may be provided with one or more lubrication taps 28a which afford access to its packing for introduction of a suitable lubricant therein. The wall of the stuffing box just above the bonnet head and below the bonnet yoke flange is tapped, not shown, to permit attaching thereto the threaded end of a tube which serves as a bleed connection for removing fluid material which leaks or seeps into the bonnet head when the disc assembly 29 is in the valve shutting position. The inside surface of the bonnet, the bonnet head and the valve body are covered by a depth of insulation 40 of any preferred character and composition and of sufficient insulating property to maintain the metal walls of said bonnet, bonnet head and valve body at a temperature not materially exceeding about 650° F. when the fluid flowing through the valve is at the highest design temperature, which in this case is 1600° F., or more. The bonnet flange and body bonnet flange are held together by the circular series of bolts 16. The joint between these flanges is sealed by a welded canopy 41, FIG. 5.

The disc assembly 29 includes a main frame 47 that has a central upwardly extending collar 48 at the top thereof bored to receive the lower end of the stem tube 22. The lower end of the stem tube 22 is threaded to receive a nut 49 which by its rotation carries the collar 48 snugly against the shoulder formed in the enlargement 50 and thus removably fixes the disc assembly 29 to the stem tube 22. The joint at the shoulder of the enlargement 50 is preferably sealed by welding.

Figure 5:
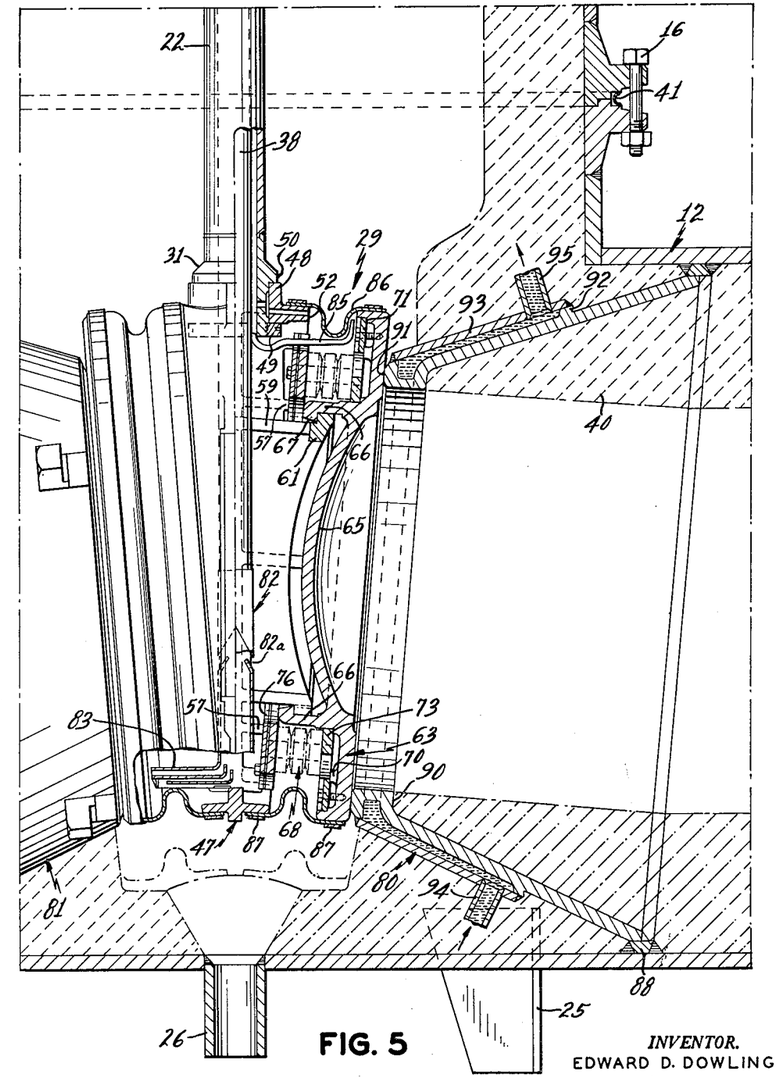
FIG. 5 is a sectional view, corresponding to FIG. 2 but on an enlarged scale, of the area of FIG. 2 outlined by the dot and dash line identified thereon by the numeral 5.
Figure 6:
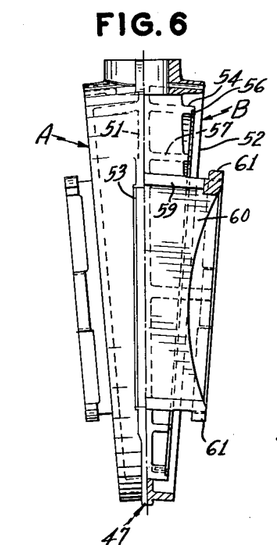
FIG. 6 is an end view, one half in elevation and the other half in section, of a valve closure member.
Figure 7:
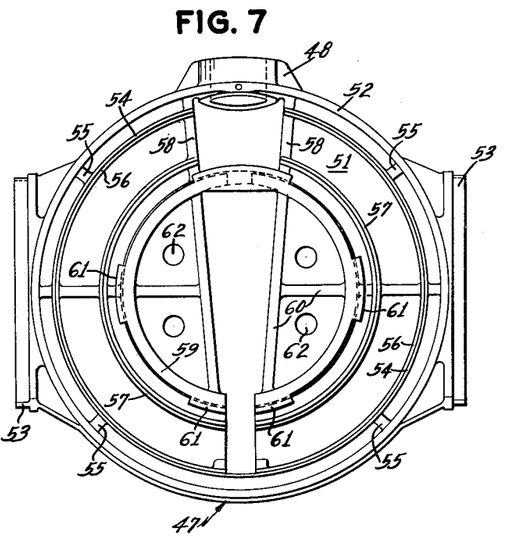
FIG. 7 is a front view of the valve closure member of FIG. 6.
Figure 8:
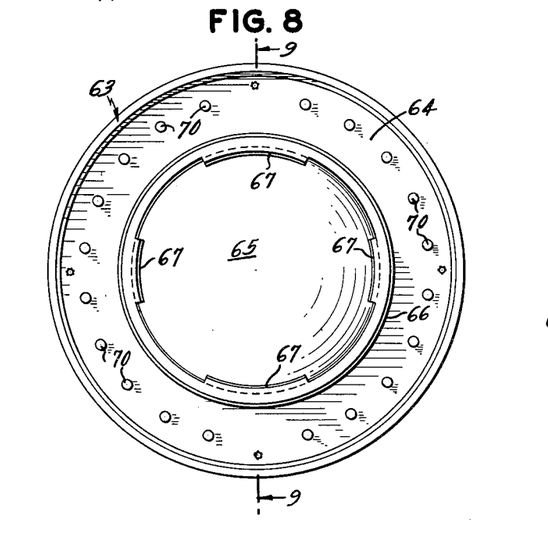
FIG. 8 is a front view of a seating element.
Figure 9:
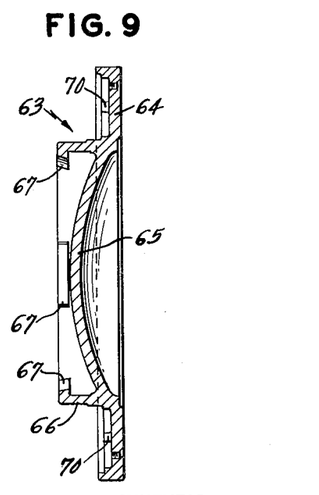
FIG. 9 is a section taken along the line 9—9 of FIG. 8.

The main frame 47, FIGS. 2 and 5–7, includes a central disc 51 which has a plurality of concentric cylindrical flanges extending outwardly therefrom. Since a plane passing through the middle of the thickness of the disc 51 will divide the main frame 47 into two parts, A and B, mirror images one of the other, a description of one of said parts will suffice for both. A cylindrical flange 52 forms the outer periphery of the disc 51. The generating axis of the flange is not disposed normal to the axis of the stem tube 22 but rather is disposed so as to be parallel to the axis of the seat attachment cone frustum 80, in the case of part A cone frustum 81. The flange 52 as well as the flanges 54, 57 and 59 which are concentric thereto, are cut to present respective outer edges that are in planes normal to said generating axis. Attached to the flange 52 are diametrically opposed guide members 53 which serve to guide the disc assembly 29 in its upward and downward movements. The central portion of the disc 51 below the collar 48 is removed, as best shown in FIGS. 5 and 7, to accommodate the lower end of the cooling water supply tube 38 and the cooling water distributor 82. Adjacent the flange 52 is a spring assembly supporting flange 54 which is interrupted at the top and bottom of the main frame 47. The disc 51 is thickened to provide radial reinforcing webs 55 between the flange 52 and 54. The outer edge of the flange 54 is machined to provide a shoulder configuration 56.

Inwardly of flange 54 is a second spring supporting flange 57 which is interrupted in the same way as the flange 54. The disc 51 is thickened to provide the reinforcing webs 58 between the flanges 54 and 57. The flanges 52, 54 and 57 are tapered as above indicated, and parts A and B together provide a wedgelike configuration with the opposite faces thereof swung through equal angles from the centerline of the said main frame 47. Concentrically within flange 57 is a disc ring flange 59 which is interrupted in the same way as the flange 54. The flange 59 is of a width to extend well beyond the flange 52 and its face is in a plane parallel to the face of the flange 52. The disc 51 is thickened to provide reinforcing webs 60. The webs 60 terminate in outer curved surfaces so as to permit the accommodation adjacent thereto of a body of spherical periphery to be described. From the outer periphery of the flange 59 extend the quadrantly spaced lugs 61. The outer periphery of these lugs is circular and their external surfaces are carefully machined and ground. The upper portion of flange 52 is bored to provide vent holes communicating its exterior to the interior of the collar 48. The disc 51 within the flange 59 is perforated as by a series of holes 62 to provide communication between the faces thereof. The upper one of the lugs 61 connects the upper separated ends of the flange 59 and serves to reinforce the main frame structure.

A valve disc 63 is mounted on each of the flanges 59. Valve disc 63 includes an outer flat annular portion 64 which is machined to close tolerances to provide a flat surface and after being ground to a high finish, is plated with a hard metal, as for instance, chromium. Within the portion 64 the disc 63 assumes a spherical configuration 65. At the juncture of the portions 64 and 65 and extending inwardly of the disc is a flange 66 of sufficient inner diameter to encircle the outwardly extending lugs 61 of the flange 59. The flange 66 includes quadrantly spaced inwardly extending lugs 67 which are adapted to engage the lugs 61. The inner surfaces of the lugs 67 are angularly disposed relative to the central axis of the flange 66. Each disc 63 is positioned on the main frame 47 by placing the respective flange 66 around the cooperating flange 59 with the lugs 67 between the lugs 61 and then rotating the disc 63 until the lugs 67 engage lugs 61. This is done after the spring assemblies 68 have been put in position on the main frame 47. As explained hereinafter, the spring assemblies 68 will retain the discs 63 in the assembled position. Thus positioned, and with the spring assemblies 68 in position, the discs 63 will be capable of a limited universal movement relative to the main frame 47 as required to properly align said discs with the respective valve seats. The underside of the annular portion 64 of the disc 63 is shaped to accommodate the spring assembly 68 and to provide an annular water circulation passageway. For this purpose a circular series of bosses 70 extend from the undersurface of the portion 64 for seating of an annular baffle member 71 thereon. The baffle member 71 is retained in position by a circular series of bolts which pass therethrough and screw into the tapped holes in said portion 64.

The spring assembly 68 may assume any suitable form which will provide the service required. Thus, it may comprise a circular series of spaced helical springs, or similar. It is presently preferred to employ as the spring members 68a a plurality of stacks of conical disc springs, as for instance, the well-known "Belleville" springs readily available in the art. The spring member 68a is assembled between a pair of flat annular pieces 72 and 73. Said spring members 68a are perforated to accommodate the shanks of a circular series of bolts whose enlarged heads bear on the member 72 and whose threaded shanks screw into the member 73. By adjusting the position of the bolts 74, a predetermined preloading of the spring members 68a, and consequently the spring assembly 68, is obtained. The arrangement is such that the spring assembly 68 is preloaded to provide a force that is greater than the force that can be developed on the face of the respective disc 63 by reason of the pressure differential between the pressure on said face and that within the main frame 47. To facilitate the positioning of the spring member 68 in proper relation to the various surfaces of the disc assembly 29, shimming material 75 may be employed on the inside surface of the spring retaining member 72. To hold the shim material 75 in position an annular shim retainer 76 is provided. The retainer 76 is perforated with holes of sufficient diameter to accommodate the heads of the bolts 74 without interference and to permit the rotation of said bolts for preloading of the spring members 68a. A plurality of small bolts pass through the shim retainer 76 and screw into the spring retainer member 72 for holding the retainer member 76 in position. The annular piece 72, the shim material 75 and the shim retainer 76 are not complete annuli as they have the lower portion thereof cut away to accommodate the laterally extending portion 83 of the cooling water distributor tube 82. The annular piece 73 also has its lower end notched to accommodate said extending portion 83. The upper ends of the annular piece 72, the shim material 75, and the annular piece 76, as well as the annular piece 73 have an arcuate portion cut away to permit the passage therethrough of the cooling water on its way outwardly of the assembly 29. Each of the spring assemblies 68 is positioned on the main frame 47 with the portion thereof comprising the outer peripheries of the shim retainer 76 and the piece 72 seated on the shoulder 56 formed in the flange 54. The inner periphery of the assemblies 68 are unrestrained but the inner portion of the shim retainers 76 rest on the flanges 57. By this arrangement the main frame 47 has transmitted thereto the loadings due to the springs 68a and the pressure on the face of the discs 63. The annular pieces 73 have their inner portions resting on shoulders formed at the base of the flanges 66 of the discs 63 while the outer portions rest on the bosses 70. By this arrangement the spring assemblies 68 transmit their loadings to the respective disc 63 and receive therefrom the loadings due to the pressure of the medium at the respective side of the valve 10.

The cooling medium distributor tube 82 telescopes over the end of the cooling water supply tube 38 and is united thereto as by a circumferential weld. The distributor tube 82 below its telescoping portion changes from a circular to a square cross section and is provided with one or more lateral outlets 82a for introducing the cooling water into the space in back of the discs 63. At its lower end the distributor 82 has a pair of opposed laterally extending branches 83 which are provided with internal baffles 84 for guiding the cooling water to various portions of the disc assembly 29 as shown. The arrangement is such that a direct flow of the cooling water is provided at each essential portion of the assembly. The entering cooling water flows at a sufficient rate to maintain the components of the assembly 29 below a maximum temperature which preferably is below the boiling point of water. The cooling water as it flows upwardly leaves the assembly 29 through the annular space provided between the water inlet tube 38 and the stem tube 22. In order to prevent the accumulation of air or other gas at the top of the assembly a vent tube 85 is provided. Tube 85 will conduct any gas accumulation at the upper end of the disc 63 away therefrom to the annular space between tube 22 and the tube 38. Any gas that may accumulate at the top of the main frame 47 will flow inwardly to said annular space through the bleed passageways provided in the upper end of the flange 52 and the collar 48. The assembly 29 is sealed between the frame 47 and the discs 63 by an expansion joint bellows 86. Each bellows 86 is united to its respective flange 52 and disc 63. For this purpose and in order to provide a strong leakproof arrangement each end of the bellows 86 is encircled by a ring 87. Each edge of the rings 87 at the end of a respective bellows is united to the edges of the bellows 86 and to the disc 63 or the flange 52, as the case may be, by a fillet weld while the opposite end of said ring is welded only to the bellows 86.

A pair of frusto-conical seat attachment members 80 and 81 are disposed within the valve body 12 across the bottom cylindrical component of said body. The smaller diameter of each of the frusto-conical members 80 and 81 is positioned to face the respective discs 63 while the larger diameter of each of said members 80 and 81 faces the end of the valve body 12. The frusto-conical members 80 and 81 are disposed with their respective generating axes at an angle to the longitudinal axis of the cylindrical portion 13 to facilitate the seating of the discs 63. The frusto-conical members 80 and 81 are united at their larger ends to the valve body as by welding. While the welding may be effected in various convenient ways, it is at present preferred to weld a ring 88 to the valve body and then unite the respective frusto-conical member 80 and 81 to the ring 88 by the circumferential weld as shown. The frusto-conical members 80 and 81 are identical so that the description of one will suffice for both. Referring to the member 80, the inner end has an enlarged portion 90 whose face forms the valve seat 91. The valve seat 91 is formed by accurately machining and grinding said face to assure a flat surface within a single plane. Intermediate the ends of the member 80 is an integral ring 92 projecting outwardly therefrom. Upon the ring 92 and the outer end of the enlargement 90 is positioned a cover plate 93. The plate 93 is welded to the ring 92 and to the outer end of the enlargement 90 to provide a water jacket through which cooling water may be circulated to cool the seat 91 and the portion of the member 80 adjacent said seat. To assure maximum cooling of the seat 91, the portion 90 is of a U shaped section so that the seat 91 may be in close proximity to the cooling water. The plate 93 is provided with a hole at its lower end into which extends the cooling water inlet tube 94. This tube is sealed to the plate 93 as by a suitable fillet weld. At the top of the plate 93 is a similar hole into which extends the cooling water outlet tube 95, the tube 95 is also sealed to the plate 93. The insulation material 40, as shown, lines the inner surface of the seat attachment cone 80 to the inner cylindrical surface of the enlargement 90. Insulating material 40 likewise covers the whole of the outer surface of the seat attachment cone 80 to substantially the smaller end of the cover plate 93 as shown. Thus, only the inner cylindrical surface of the enlargement 90 is exposed when the disc assembly 29 is in the flow shut off position. When the disc assembly 29 is retracted to the upper dotted line position of FIG. 2 to permit unrestricted flow through the valve, the portion of the enlargement 90 exposed to the heated medium is increased somewhat. In any event, the cooling service is kept to a minimum so that the temperature of the enlargement 90 and the seat 91 may be kept to such levels that the seat 91 maintains its uni-planar condition, and does not become warped or distorted.

Figure 12:
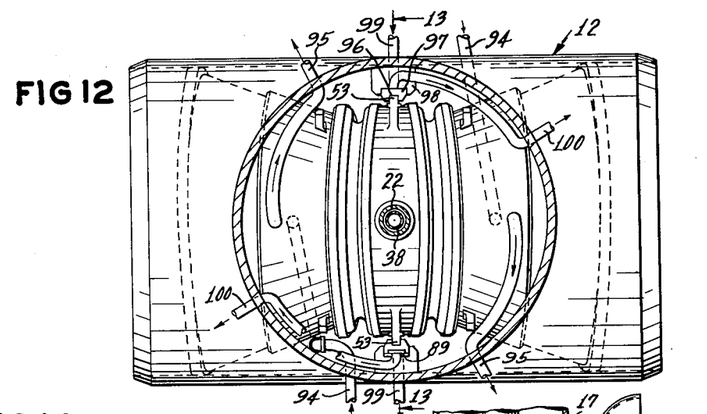
FIG. 12 is a sectional view on an enlarged scale taken along the lines 12—12 of FIG. 1.
Figures 13, 14, 15, 16:
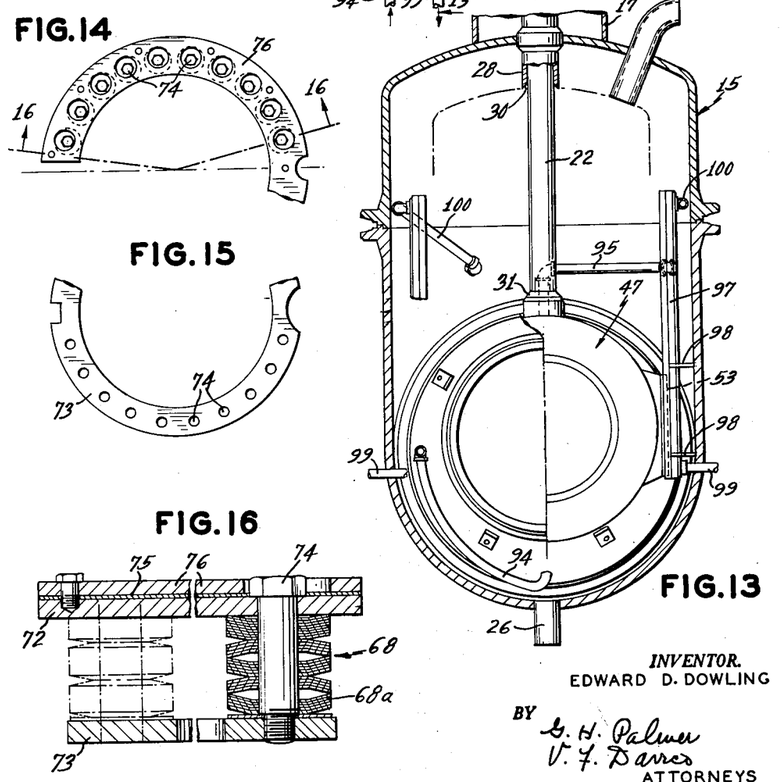
FIG. 13 is a sectional view taken along the line 13—13 of FIG. 12.
FIG. 14 is a plan fragmentary view of a spring assembly.
FIG. 15 is a view similar to FIG. 14 but looking up at the bottom of the assembly.
FIG. 16 is a sectional view, on an enlarged scale, taken along the line 16—16 of FIG. 14.

The guides 53 as shown in FIGS. 12 and 13, are positioned to move in the guide grooves 96 of the guideways 97 which are carried at the sides of the valve body 12 by plates 98 which are attached to the guideways 97 and to the walls of the valve body 12 in any convenient manner as by welding. Each guideway 97 has a longitudinal passageway extending substantially the length thereof for flow of cooling water therethrough. Water is supplied to the lower end of the passageway through a cooling water inlet tube 99 which enters the valve body 12 adjacent the bottom region thereof through an appropriate hole therein. The line 99 is welded to the wall of the valve body 12 to seal the joint and is likewise united to the guideway 97, preferably by welding. The cooling water leaves the upper end of the guideway 97 through the line 100, connected to said guiderail as by welding, which exits through the wall of the valve body 12 adjacent the upper end thereof. As best shown in FIG. 12, the lines 94 that supply cooling water to the seat attachment cones 80 and 81, enter through the walls of the valve body 12 adjacent the lower section thereof while the lines 95 which lead the cooling water away from said seat attachment cones also pass through the walls of the valve body 12, but at a level adjacent the top thereof. All of the water inlet and outlet lines mentioned may have fixtures therein which provide for the making and breaking of connections in the usual manner to facilitate assembly.

The operation of the valve will now be described. It is assumed that the disc assembly 29 occupies the dotted line position of FIG. 2, that the gas flowing through the valve is at about 50 p.s.i.g., that temperature of said gas is at about 1600° F., and that it is desired to close the valve. Under these conditions the lines supplying motor fluid to the hydraulic cylinder 19 will have been controlled in the usual manner to supply fluid to move the piston rod in the direction to carry the disc assembly 29 to the dotted line position. At this time the relation between the disc 63 and the flange 59, and particularly, the relation between the lugs 61 and 67, will be as shown in FIG. 5, that is, the spring assembly 68, due to its preloading effect will be exerting its maximum influence, and will move lugs 67 into contact with the lugs 61 so that the disc 65 will be at the extreme position of its outward movement. To accomplish the closing of the valve the lines to the hydraulic cylinder 19 are controlled to force the piston in the direction to move the disc assembly 29 from the dotted line position of FIG. 2 through the solid line position shown of FIG. 5, wherein the disc 63, and particularly the vertical face 64, thereof will just begin contact with the seat 91 and into the dotted line position of FIG. 5 wherein the disc assembly 29 is fully sealed. As the motion downward of the disc assembly 29 carries said assembly into said solid line position, the disc face 64 will engage the seat 91 and the disc 63 will rock by movement of the lugs 67 relative to the lugs 61, as required to place the face 64 of the disc 63 in the same plane as that of the seat 91. As this movement continues, the face 64 will rub or slide relative to the seat 91. At this time the distance between the face 64 and the central line of the main frame 47 decreases. Thus, the force exerted by the seat 91 on the face 64 will move the disc 63 towards the center line of the main frame 47 against the force exerted by the preloading of the springs 68. The collapsing force is augmented by the difference in pressure between that on the front face of the disc 63 and that on the back face thereof. The adjustive movement and inward movement of the disc 63 will continue until the disc assembly 29 reaches the fully closed position, the dotted line position of FIG. 5. The disc assembly 29 will maintain this closed position regardless of the temperature or pressure conditions on either side thereof, until moved away from it by the action of the cylinder 19. It is noted that since the disc assembly 29 and the exposed portions of the seat attachment cones 80 and 81 are maintained at temperatures in the order of, or below, the boiling point of water, there will be no distortion or other movement of said cones, one relative to the other. In the downward movement of the disc assembly 29, a difference in pressure between the inlet side of the valve and the outlet side of the valve will tend to move the disc assembly 29 in the direction of the lower pressure. A limited amount of movement of this character is provided as the stem tube 22 is deliberately so proportioned that it is sufficiently flexible to permit this movement, without destruction or distortion of said stem tube 22. For this same purpose the grooves 96 of the guideways 97 are made somewhat wider than the guides 53.

In the above described present preferred embodiment of the invention the valve body and the component parts thereof, are fabricated from either carbon steel or a low ferritic alloy such as carbon—½% molybdenum steel. The insulating lining will be in the order of thicknesses indicated above, that is, about 9″. The insulation may be of various character and materials and may be formed of an outer porous material covered by an inner denser, and better wear resistant material. It is preferable to provide an insulation lining that will reduce the shell temperature and the temperature of the internal parts of the valve 10 that are not directly subjected to water cooling to temperatures which will not exceed 650° F. when the gas temperature is at the maximum of 1600° F., or more.

As indicated, the water cooled parts include the seats, the disc assembly, the disc guides, the disc stem assembly, and the stuffing box assembly. The insulation minimizes the quantity of water required for the cooling service, and in order to further conserve heat and still further minimize the quantity of water required, the exposed uninsulated areas of the cooled parts are kept to a minimum.

The sealing principle made use of in the novel valve of the invention is that two flat, highly finished, non-galling surfaces held in contact by pressure considerably in excess of the pressure being sealed against, are rubbed together for a definite distance while under pressure before closure is completed. This assures substantially complete closure even with valves of the size indicated above.

Each seat 91 is attached to the valve body 12 by an internal skirt in the shape of right circular cone 80, or 81, and arranged so that the metal temperature gradient is uniform around its entire periphery to the end that distortions of the seat face are substantially eliminated. The skirts, cone 80 and 81, are so proportioned that the temperature at the intersections with the external shell 12 and the strains resulting from thermal movement, consisting principally of a slight rotation at the intersection, are easily kept within design limits. By cooling, the temperature of the exposed parts is so reduced that the mechanical properties of said parts are retained substantially unimpaired. Another effect of the cooling is the reduction of the amount of differential expansion that will occur between the internal metallic path, seat cone to disc to seat cone, and the external path of the valve body. Such differential expansion will occur, and at times it will be greater for one seat cone than the other. The present invention takes account of these thermal movements and compensates for them by elastic strains with predictable and moderate accompanying stresses.

The two separate discs are fitted into the main frame with freedom to move in an axial direction and with freedom for some tilting or cocking on this axis, but are restrained for any appreciable "offset" or lateral movement. The axial movement of each disc inward is opposed by the preloaded spring arrangement, whereas movement outward is restrained by a bayonet catch arrangement consisting of lugs between the main frame and each disc. This also acts to transmit the stem thrust from the main frame to each disc when closing or opening the valve.

I claim:

1. A valve comprising a body having a fluid passageway therethrough, a valve seat in said body disposed in an inclined plane across said passageway, a movable valve gate including a member defining a face disposed at an angle approximating the angle of said seat, means mounting said member for adjustive movements to and from said seat along an axis parallel to a line normal to said seat, resilient means on said gate adapted to apply force to said member uniformly along the full extent of the perimeter of said face to urge said member along said axis in the direction of said seat, means for actuating said gate in one direction to carry said face into engagement with said seat and in the opposite direction to carry said face away from said seat, said face in moving to the said seat engaging position initially contacting said seat and in its further movement rubbing relative to said seat while moving along said axis against the urging force of said resilient means to form a tight seal between said face defining member and said seat, and means independent of said member engaging said resilient means for applying a preload thereto sufficient to maintain said face and said seat in sealing relation against the forces on said member due to the fluid and the seating of said face on said seat.

2. A valve comprising a body having a fluid passageway therethrough, a first member in said body having a circular valve seat formed thereon disposed in an inclined plane across said passageway, a movable valve gate including a disc member having a face formed thereon disposed at an angle approximating the angle of said seat, means mounting said disc for adjustive movements to and from said seat along an axis parallel to a line normal to said seat, resilient means on said gate positioned in line with said face and distributed along the full extent thereof adapted to apply force to said disc uniformly along the full extent of said face to urge said disc along said axis in the direction of said seat, means for actuating said gate in one direction to carry said face into engagement with said seat and in an opposite direction to carry said face away from said seat, said face in moving to the said seat engaging position initially contacting said seat and in its further movement rubbing relative to said seat while moving along said axis against the urging force of said resilient means to form a tight seal between said face defining member and said seat, and means independent of said member engaging said resilient means for applying a preload thereto sufficient to maintain said face and said seat in sealing relation against the forces on said member due to the fluid and the seating of said face on said seat.

3. A valve comprising a body having a fluid passageway therethrough, said body divided into two symmetric halves by a central vertical plane, each of said halves including a valve seat disposed in an inclined plane across said passageway, a movable valve gate within said body divided by said vertical plane into two symmetric halves, each of said halves including a member defining a face disposed at an angle approximating the angle of said seat, means mounting said member for adjustive movements to and from said seat along an axis parallel to a line normal to said seat, resilient means on said gate adapted to apply a force to said member uniformly along the full extent of the perimeter of said face to urge said member along said axis in the direction of said seat, means for actuating said gate in one direction to carry said faces into engagement with their respective seats and in the opposite direction to carry said faces away from said seats, each said face in moving to the seat engagement position initially contacting its respective seat and in its further movement rubbing relative to said seat while moving along its respective axis against the urging force of its respective resilient means to form a fluid tight seal, each of said halves further including means independent of said member engaging said resilient means for applying a preload thereto sufficient to maintain said face and said seat in sealing relation against the forces on said member due to the fluid and the sealing of said face on said seat.

4. A valve formed of metal parts and adapted to control the flow of fluids at temperatures sufficiently high to cause material changes in size and shape of said metal parts, said valve comprising a body, including a cylindrical section, defined by external walls, a depth of heat insulating material covering said walls and defining a fluid passageway through said body, an element in the form of a frustum of a right circular cone with its circular ends in parallel planes, said element having its base end attached to said cylindrical section of said walls, said element including a valve seat formed at its other end whereby forces generated by reason of thermal effects are distributed uniformly around the whole of said seat and in any resulting movement the whole of said seat remains normal to the axis of said element, the major portion of the surface of said element covered by said fluid passageway defining heat insulating material, said seat exposed to the flowing fluid at an acute angle to the axis of said passageway, means for cooling said other end of said element to maintain said seat at temperatures below those at which material distortion takes place, a movable hollow valve gate having a face defining member disposed at an angle approximating the angle of said seat, means mounting said face defining member for adjustive movements towards and away from said seat, means for actuating said valve gate in one direction to carry said face defining member into engagement with said seat to shut off fluid flow through said passageway and in an opposite direction to carry said face defining member out of engagement with said seat to permit fluid flow through said passageway, said face defining member in moving to said seat engaging position initially contacting said seat and in its further motion rubbing relatve to said seat while moving along the axis of said passageway to form a tight seal between said face and said seat, said valve gate actuating means including a hollow member communicating externally of said valve, and means for flowing a cooling medium through said hollow member into said hollow valve gate and back through said hollow member to cool said valve gate and said face defining member to maintain said face defining member at temperatures below those at which substantial distortion thereof takes place.

5. A valve formed of metal parts and adapted to control the flow of fluids at temperatures sufficiently high to cause material changes in size and shape of said metal parts, said valve comprising a body, including a cylindrical section, defined by external walls, a depth of heat insulating material covering said walls and defining a fluid passageway through said body, an element in the shape of the frustum of a right circular cone having its base end attached to said cylindrical section of said wall with its axis angularly disposed relative to the axis of said cylindrical section, said element including a valve seat formed at its other end and disposed in a plane normal to its axis whereby forces generated by reason of thermal effects are distributed uniformly around the whole of said seat and in any resulting movement the whole of said seat remains normal to the axis of said element, the major portion of the surface of said element covered by said fluid passageway defining heat insulating material, said seat exposed to the flowing fluid, means for cooling said other end of said element to maintain said seat at temperatures below those at which material distortion takes place, a movable hollow valve gate having a face defining member disposed at an angle approximating the angle of said seat, means mounting said face defining member for adjustive movements towards and away from said seat, means for actuating said valve gate in one direction to carry said face defining member into engagement with said seat to shut off fluid flow through said passageway and in an opposite direction to carry said face defining member out of engagement with said seat to permit fluid flow through said passageway, said face defining member in moving to said seat engaging position initially contacting said seat and in its further motion rubbing relative to said seat while moving along the axis of said passageway to form a tight seal between said face and said seat.

6. A valve formed of metal parts and adapted to control the flow of fluids at temperatures sufficiently high to cause material changes in size and shape of said metal parts, said valve comprising a body, including a cylindrical section, defined by external walls, a depth of heat insulating material covering said walls and defining a fluid passageway through said cylindrical section, an element in the shape of a frustum of a right circular cone having its base end attached to the walls of said cylindrical section, said element including a circular flange extending outwardly thereof at its other end disposed in a plane normal to the axis of said cone frustum, a valve seat formed on the top surface of said flange, the major portion of the surface of said element covered by said fluid passageway defining heat insulating material, said flange and seat exposed to the hot fluid, the axis of said frusto-conical element angularly disposed to the axis of said cylindrical section, cooling jacket means encircling said flange and said other end of said element and united thereto to form a fluid tight cooling fluid circulation jacket, means for supplying cooling medium to and removing cooling medium from said jacket to cool said other end of said element and said flange to maintain said seat at temperatures below those at which material distortion takes place, a movable hollow valve gate having a face defining member disposed at an angle to said cylindrical section approximating the angle of said seat, means mounting said face defining member for adjustive movements towards and away from said seat, means for actuating said valve gate in one direction to carry said face defining member into engagement with said seat to shut off fluid flow through said passageway and in an opposite direction to carry said face defining member out of engagement with said seat to permit fluid flow through said passageway, said face defining member in moving to said seat engaging position initially contacting said seat, said valve gate including means permitting said face defining member in its further motion to rub relative to said seat while moving along the axis of said passageway to form a tight seal between said face and said seat, said valve gate actuating means including a hollow member communicating externally of said valve, and means for flowing a cooling medium through said hollow member into said hollow valve gate and back through said hollow member to cool said valve gate and said face defining member to maintain said face defining member at temperatures below those at which substantial distortion thereof takes place.

7. A valve formed of metal parts and adapted to control the flow of fluids at temperatures sufficiently high to cause material changes in size and shape of said metal parts, said valve comprising a body, defined by external walls, including a central section, an inlet section and an outlet section, a depth of heat insulating material covering said walls and defining a fluid passageway through said inlet and outlet sections leading to and from said central section, valve seat defining means at the juncture of said central section and said fluid passageway disposed across said passageway at an acute angle to the axis of said passageway, a movable valve gate in said central section reciprocatable into alignment with said valve seat for shutting off fluid flow through said passageway and out of alignment with said valve seat to permit fluid flow through said passageway, said valve gate including a hollow frame member, said frame member provided with laterally extending guide-support means, valve face defining means, means mounted in said support means for limited lateral reciprocating movement of said face defining means, means engaging said frame and said face defining member constantly urging said face defining member towards said seat defining means, a hollow stem member extending through said valve and having one end thereof connected to said frame member, means at the other end of said stem member for supplying a cooling medium through said stem member and into said frame, and means for withdrawing cooling medium from said frame and discharging it through said other end, and flexible means united to said frame and said face defining means for providing a fluid tight assembly comprising said frame and face defining means.

8. The valve defined in claim 7 in which, said guide means on said frame extends therefrom in a central plane thereof disposed across the fluid passageway, and said central section includes elongated guide elements disposed parallel to said plane and engaged by said guide means to guide said gate valve in its movements into and out of alignment with said valve seat, said guide elements being hollow, and means for circulating a cooling medium through said guide elements, said guide elements spaced to provide for limited adjustive movements of said valve gate along the axis of said fluid passageway.

9. A valve formed of metal parts and adapted to control the flow of fluids at temperatures sufficiently high to cause material changes in size and shape of said metal parts, said valve comprising a body, defined by external walls, including a central section, an inlet section and an outlet section, a depth of heat insulating material covering said walls and defining a fluid passageway through said inlet and outlet sections leading to and from said central section, means defining a circular valve seat at each juncture of said central section and said fluid passageway, each said seat defining means disposed across said passageway at an angle to the axis of said passageway, a movable wedge shaped valve gate in said central section reciprocatable into alignment with said valve seats for shutting off fluid flow through said passageway and out of alignment with said valve seats to permit fluid flow through said passageway, said valve gate divided into symmetric halves by a central plane transverse to the axis of said fluid passageway, said valve gate including a hollow frame member, each half of said frame member provided with a circular guide-support flange whose generating axis is disposed parallel to the generating axis of said seat defining means, said guide-support flange terminating in an interrupted transverse flange, a valve face defining disc having a circular flange extending therefrom, means mounting said valve face defining disc on said guide support flange for guided movement thereon, said disc flange terminating in an interrupted support flange adapted to interlock with said interrupted flange of said guide support flange, means engaging said frame and said disc constantly urging said disc towards its respective seat, a hollow stem member extending through said valve and having one end thereof connected to said frame member, means at the other end of said stem member for supplying a cooling medium through said stem member and into said frame, and means for withdrawing cooling medium from said frame and discharging it through said other end, and flexible means united to said frame and said discs providing a fluid tight assembly comprising said frame and said discs.

10. A valve formed of metal parts and adapted to control the flow of fluids at temperatures sufficiently high to cause material changes in size and shape of said metal parts, said valve comprising a body defined by external walls, including a central section, and inlet section and an outlet section, a depth of heat insulating material covering said walls and defining a fluid passageway through said inlet and outlet sections leading to and from said central section, means defining a circular valve seat at each juncture of said central section and said fluid passageway, each said seat defining means disposed across said passageway at an angle to the axis of said passageway, a movable wedge shaped valve gate in said central section reciprocatable into alignment with said valve seats for shutting off fluid flow through said passageway and out of alignment with said valve seats to permit fluid flow through said passageway, said valve gate divided into symmetric halves by a central plane transverse to the axis of said fluid passageway, said valve gate including a hollow frame member, each half of said frame member provided with a circular guide-support flange whose generating axis is disposed parallel to the generating axis of said seat defining means, said guide-support flange terminating in an interrupted transverse flange, said half including an annular spring support, a valve face defining disc having a circular flange extending therefrom, means mounting said valve face defining disc on said guide support flange for guided movement thereon, said disc flange terminating in an interrupted support flange adapted to interlock with said interrupted flange of said guide support flange, a preloaded annular spring assembly engaging said annular spring support and said disc to constantly urge said disc towards its respective seat, a hollow stem member extending through said valve and having one end thereof connected to said frame member, means at the other end of said stem member for supplying a cooling medium through stem member and into said frame, means for withdrawing cooling medium from said frame and discharging it through said other end, and flexible means united to said frame and said discs providing a fluid tight assembly comprising said frame and said discs.

References Cited in the file of this patent

UNITED STATES PATENTS

| | | |
|---|---|---|
| 615,778 | Aldrich | Dec. 13, 1898 |
| 1,323,328 | Slick et al. | Dec. 2, 1919 |
| 2,042,301 | Fox | May 26, 1936 |
| 2,065,628 | Taylor et al. | Dec. 29, 1936 |
| 2,075,123 | Lunken | Mar. 30, 1937 |
| 2,467,945 | Pottmeyer | Apr. 19, 1949 |
| 2,868,495 | Lucas | Jan. 13, 1959 |

FOREIGN PATENTS

| | | |
|---|---|---|
| 650,105 | Great Britain | Feb. 14, 1951 |
| 171,592 | Austria | June 10, 1952 |
| 888,490 | Germany | Sept. 3, 1953 |
| 1,056,771 | France | Oct. 28, 1953 |
| 506,418 | Canada | Oct. 12, 1954 |